United States Patent
Erell et al.

(10) Patent No.: US 8,699,528 B2
(45) Date of Patent: Apr. 15, 2014

(54) SYSTEMS AND METHODS FOR COMMUNICATION USING DEDICATED REFERENCE SIGNAL (DRS)

(75) Inventors: Adoram Erell, Herzliya (IL); Daniel Yellin, Ra'anana (IL)

(73) Assignee: Marvell World Trade Ltd., St. Michael (BB)

( * ) Notice: Subject to any disclaimer, the term of this patent is extended or adjusted under 35 U.S.C. 154(b) by 565 days.

(21) Appl. No.: 12/983,898

(22) Filed: Jan. 4, 2011

(65) Prior Publication Data

US 2011/0096704 A1    Apr. 28, 2011

Related U.S. Application Data

(63) Continuation-in-part of application No. 12/493,252, filed on Jun. 29, 2009.

(60) Provisional application No. 61/156,144, filed on Feb. 27, 2009, provisional application No. 61/293,115, filed on Jan. 7, 2010.

(51) Int. Cl.
*H04J 1/16* (2006.01)

(52) U.S. Cl.
USPC ........... 370/491; 370/276; 370/295; 455/134; 455/135; 455/500

(58) Field of Classification Search
USPC .......... 370/276, 295, 464, 491; 455/101, 500, 455/134, 135
See application file for complete search history.

(56) References Cited

U.S. PATENT DOCUMENTS

| | | |
|---|---|---|
| 5,231,629 A | 7/1993 | Kotzin et al. |
| 5,349,567 A | 9/1994 | Reed |
| 5,940,439 A | 8/1999 | Kleider et al. |
| 6,466,904 B1 | 10/2002 | Gao et al. |
| 6,512,750 B1 | 1/2003 | Palenius |

(Continued)

FOREIGN PATENT DOCUMENTS

| | | |
|---|---|---|
| EP | 2182754 A1 | 5/2010 |
| JP | 2008236222 A | 2/2008 |

(Continued)

OTHER PUBLICATIONS

Japanese Patent Application # 2011-544111 Office Action dated Mar. 12, 2013.

(Continued)

*Primary Examiner* — Un C Cho
*Assistant Examiner* — Siming Liu

(57) ABSTRACT

A method for communication includes receiving in a receiver signals, which include one or more dedicated reference signals, that are transmitted from a transmitter over a communication channel in multiple blocks. The signals in each block, including the dedicated reference signals, are transmitted on a respective group of subcarriers over a respective time interval and are precoded using a respective precoding scheme that maps the signals onto multiple antenna ports of the transmitter. Based on the received signals, feedback is computed in the receiver with respect to the communication channel in each of multiple spectral sub-bands, and the feedback for the multiple spectral sub-bands is reported to the transmitter. One or more parameters of the communication channel are estimated jointly over the dedicated reference signals included in each of the spectral sub-bands for which the feedback is reported. The signals are decoded based on the estimated parameters.

13 Claims, 3 Drawing Sheets

(56) References Cited

U.S. PATENT DOCUMENTS

| | | |
|---|---|---|
| 6,757,319 B1 | 6/2004 | Parsa et al. |
| 6,865,237 B1 | 3/2005 | Boariu et al. |
| 7,839,944 B2 | 11/2010 | Lee et al. |
| 7,941,186 B2 | 5/2011 | Cho et al. |
| 8,036,286 B2 | 10/2011 | Lee et al. |
| 8,068,555 B2 | 11/2011 | Jongren et al. |
| 8,098,750 B2 | 1/2012 | Mueck et al. |
| 8,179,775 B2 | 5/2012 | Chen et al. |
| 8,325,844 B2 | 12/2012 | Walton et al. |
| 2003/0035491 A1 | 2/2003 | Walton et al. |
| 2005/0141630 A1 | 6/2005 | Catreaux et al. |
| 2005/0157810 A1 | 7/2005 | Raleigh et al. |
| 2005/0237920 A1 | 10/2005 | Howard et al. |
| 2005/0250544 A1 | 11/2005 | Grant et al. |
| 2006/0014554 A1 | 1/2006 | Gerlach |
| 2006/0056538 A1 | 3/2006 | Nam et al. |
| 2006/0093060 A1 | 5/2006 | Jung et al. |
| 2006/0114858 A1 | 6/2006 | Walton et al. |
| 2006/0153112 A1 | 7/2006 | Lim et al. |
| 2006/0203777 A1 | 9/2006 | Kim et al. |
| 2006/0233131 A1 | 10/2006 | Gore et al. |
| 2006/0276212 A1 | 12/2006 | Sampath et al. |
| 2007/0058746 A1 | 3/2007 | Gueguen |
| 2007/0076810 A1 | 4/2007 | Herrera et al. |
| 2007/0099578 A1 | 5/2007 | Adeney et al. |
| 2007/0149229 A1 | 6/2007 | Frederiksen et al. |
| 2007/0153731 A1 | 7/2007 | Fine |
| 2007/0160162 A1 | 7/2007 | Kim et al. |
| 2007/0165738 A1 | 7/2007 | Barriac et al. |
| 2007/0217540 A1 | 9/2007 | Onggosanusi et al. |
| 2007/0223422 A1 | 9/2007 | Kim et al. |
| 2007/0223423 A1 | 9/2007 | Kim et al. |
| 2007/0230373 A1 | 10/2007 | Li et al. |
| 2007/0248068 A1 | 10/2007 | Onggosanusi et al. |
| 2007/0253386 A1 | 11/2007 | Li et al. |
| 2007/0270170 A1 | 11/2007 | Yoon et al. |
| 2008/0013610 A1* | 1/2008 | Varadarajan et al. ......... 375/221 |
| 2008/0025336 A1 | 1/2008 | Cho et al. |
| 2008/0039067 A1 | 2/2008 | Jin et al. |
| 2008/0043702 A1 | 2/2008 | Moon et al. |
| 2008/0080364 A1 | 4/2008 | Barak et al. |
| 2008/0080632 A1 | 4/2008 | Kim et al. |
| 2008/0080634 A1 | 4/2008 | Kotecha et al. |
| 2008/0080635 A1 | 4/2008 | Hugl et al. |
| 2008/0080637 A1 | 4/2008 | Khan et al. |
| 2008/0095258 A1 | 4/2008 | She et al. |
| 2008/0101407 A1 | 5/2008 | Khan et al. |
| 2008/0108310 A1 | 5/2008 | Tong et al. |
| 2008/0112351 A1 | 5/2008 | Surineni et al. |
| 2008/0130778 A1 | 6/2008 | Xia et al. |
| 2008/0144522 A1* | 6/2008 | Chang et al. ................. 370/252 |
| 2008/0165875 A1 | 7/2008 | Mundarath et al. |
| 2008/0186212 A1 | 8/2008 | Clerckx et al. |
| 2008/0192852 A1 | 8/2008 | Kent et al. |
| 2008/0198776 A1* | 8/2008 | Seo .............................. 370/280 |
| 2008/0232494 A1 | 9/2008 | Pan et al. |
| 2008/0232503 A1 | 9/2008 | Kim |
| 2008/0247364 A1 | 10/2008 | Kim et al. |
| 2008/0247475 A1 | 10/2008 | Kim et al. |
| 2008/0268855 A1 | 10/2008 | Hanuni et al. |
| 2008/0268887 A1 | 10/2008 | Jansen et al. |
| 2008/0285433 A1 | 11/2008 | Akita et al. |
| 2008/0292013 A1 | 11/2008 | Varadarajan et al. |
| 2008/0298452 A1 | 12/2008 | Sampath et al. |
| 2008/0298482 A1 | 12/2008 | Rensburg et al. |
| 2008/0318606 A1 | 12/2008 | Tsutsui et al. |
| 2009/0011761 A1 | 1/2009 | Han et al. |
| 2009/0016263 A1 | 1/2009 | Kishigami et al. |
| 2009/0046800 A1 | 2/2009 | Xu et al. |
| 2009/0098876 A1 | 4/2009 | Khan et al. |
| 2009/0110114 A1 | 4/2009 | Onggosanusi et al. |
| 2009/0122857 A1 | 5/2009 | Li et al. |
| 2009/0161605 A1 | 6/2009 | Shen et al. |
| 2009/0180561 A1 | 7/2009 | Kim et al. |
| 2009/0252332 A1 | 10/2009 | Chang et al. |
| 2009/0252333 A1 | 10/2009 | Chang et al. |
| 2009/0282310 A1 | 11/2009 | Seok et al. |
| 2009/0296844 A1 | 12/2009 | Ihm et al. |
| 2009/0304109 A1 | 12/2009 | Kotecha |
| 2010/0031117 A1 | 2/2010 | Lee et al. |
| 2010/0034308 A1 | 2/2010 | Kim et al. |
| 2010/0035627 A1 | 2/2010 | Hou et al. |
| 2010/0054354 A1 | 3/2010 | Tosato |
| 2010/0056170 A1 | 3/2010 | Lindoff et al. |
| 2010/0061477 A1 | 3/2010 | Lee et al. |
| 2010/0067512 A1 | 3/2010 | Nam et al. |
| 2010/0069106 A1 | 3/2010 | Swarts et al. |
| 2010/0074301 A1 | 3/2010 | Howard et al. |
| 2010/0103834 A1 | 4/2010 | Gorokhov et al. |
| 2010/0158151 A1 | 6/2010 | Krauss et al. |
| 2010/0172424 A1 | 7/2010 | Perets et al. |
| 2010/0172430 A1 | 7/2010 | Melzer et al. |
| 2010/0173639 A1 | 7/2010 | Li et al. |
| 2010/0215112 A1 | 8/2010 | Tsai et al. |
| 2010/0220800 A1 | 9/2010 | Erell et al. |
| 2010/0238984 A1 | 9/2010 | Sayana et al. |
| 2010/0254474 A1 | 10/2010 | Gomadam et al. |
| 2010/0260234 A1 | 10/2010 | Thomas et al. |
| 2010/0260243 A1 | 10/2010 | Ihm et al. |
| 2010/0267341 A1 | 10/2010 | Bergel et al. |
| 2010/0271968 A1 | 10/2010 | Liu et al. |
| 2010/0272014 A1 | 10/2010 | Orlik et al. |
| 2010/0272032 A1 | 10/2010 | Sayana et al. |
| 2010/0273514 A1 | 10/2010 | Koo et al. |
| 2010/0278278 A1 | 11/2010 | Lee et al. |
| 2010/0284484 A1 | 11/2010 | Jongren et al. |
| 2010/0290548 A1 | 11/2010 | Hoshino et al. |
| 2010/0296603 A1 | 11/2010 | Lee et al. |
| 2011/0019631 A1 | 1/2011 | Kotecha et al. |
| 2011/0026413 A1 | 2/2011 | Swarts et al. |
| 2011/0034175 A1 | 2/2011 | Fong et al. |
| 2011/0058621 A1 | 3/2011 | Clerckx et al. |
| 2011/0064156 A1 | 3/2011 | Kim et al. |
| 2011/0077038 A1 | 3/2011 | Montojo et al. |
| 2011/0080969 A1 | 4/2011 | Jongren et al. |
| 2011/0085610 A1 | 4/2011 | Zhuang et al. |
| 2011/0103534 A1 | 5/2011 | Axmon et al. |
| 2011/0110403 A1 | 5/2011 | Jongren |
| 2011/0164701 A1 | 7/2011 | Nikopourdeilami et al. |
| 2011/0170435 A1 | 7/2011 | Kim et al. |
| 2011/0170638 A1 | 7/2011 | Yuan et al. |
| 2011/0188393 A1 | 8/2011 | Mallik et al. |
| 2011/0194594 A1 | 8/2011 | Noh et al. |
| 2011/0194644 A1 | 8/2011 | Liu et al. |
| 2011/0205930 A1 | 8/2011 | Rahman et al. |
| 2011/0216846 A1 | 9/2011 | Lee et al. |
| 2011/0235608 A1 | 9/2011 | Koo et al. |
| 2011/0250919 A1 | 10/2011 | Barbieri et al. |
| 2011/0268204 A1 | 11/2011 | Choi et al. |
| 2011/0274188 A1 | 11/2011 | Sayana et al. |
| 2011/0306341 A1 | 12/2011 | Klein et al. |
| 2012/0002568 A1 | 1/2012 | Tiirola et al. |
| 2012/0020433 A1 | 1/2012 | Bhattad et al. |
| 2012/0033592 A1 | 2/2012 | Kim et al. |
| 2012/0058735 A1 | 3/2012 | Vermani et al. |
| 2012/0063336 A1 | 3/2012 | Shany et al. |
| 2012/0069887 A1 | 3/2012 | Park et al. |
| 2012/0069917 A1 | 3/2012 | Liu et al. |
| 2012/0087425 A1 | 4/2012 | Gomadam et al. |
| 2012/0087435 A1 | 4/2012 | Gomadam et al. |
| 2012/0134434 A1 | 5/2012 | Chen et al. |
| 2012/0219042 A1 | 8/2012 | Onggosanusi et al. |
| 2012/0219083 A1 | 8/2012 | Tong et al. |
| 2012/0257664 A1 | 10/2012 | Yue et al. |
| 2012/0275376 A1 | 11/2012 | Sampath et al. |
| 2012/0275386 A1 | 11/2012 | Frenne et al. |
| 2012/0281620 A1 | 11/2012 | Sampath et al. |
| 2013/0028068 A1 | 1/2013 | Park et al. |
| 2013/0028344 A1 | 1/2013 | Chen et al. |
| 2013/0039284 A1 | 2/2013 | Marinier et al. |
| 2013/0051256 A1 | 2/2013 | Ong et al. |
| 2013/0107916 A1 | 5/2013 | Liu et al. |
| 2013/0176991 A1 | 7/2013 | Yi |
| 2013/0182786 A1 | 7/2013 | Frenne et al. |

(56) References Cited

U.S. PATENT DOCUMENTS

FOREIGN PATENT DOCUMENTS

| JP | 2008054125 A | 3/2008 |
|---|---|---|
| JP | 2008118411 A | 5/2008 |
| JP | 2008147792 A | 6/2008 |
| WO | 2005117283 A2 | 12/2005 |
| WO | 2007133564 A3 | 11/2007 |
| WO | 2008009157 A1 | 1/2008 |
| WO | 2008133582 A2 | 11/2008 |
| WO | 2010013950 A2 | 2/2010 |
| WO | 2011147692 A1 | 12/2011 |

OTHER PUBLICATIONS

U.S. Appl. No. 13/252,218 Office Action dated Apr. 11, 2013.
ZTE, "Link Analysis of 4Tx Codebook Design for DL SU-MIMO", 3GPP TSG-RAN WG1 #48bis, St. Julians, Malta, Mar. 26-30, 2007.
Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/253,078 Office Action dated May 23, 2013.
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Rel.10 DL MIMO", 3GPP TSG RAN WG1 62, Madrid, Spain, Aug. 23-27, 2010.
Ericsson, "Design and Evaluation of Precoder Codebooks for CSI Feedback", 3GPP TSG RAN WG1 61bis, Dresden, Germany, Jun. 28-Jul. 2, 2010.
Rapporteur, "Coordinated Multi-Point Operation for LTE", TSG RAN WG1 50, Istanbul, Turkey, Dec. 7-10, 2010.
Alcatel-Lucent et al., "Way Forward on CSI Feedback for Rel.10 DL MIMO", 3GPP TSG RAN WG1 62, Madrid, Spain, Aug. 23-27, 2010.
Alcatel-Lucent et al., "Way Forward on 8Tx Codebook for Rel.10 DL MIMO", 3GPP TSG RAN WG1 62, Madrid, Spain, Aug. 23-27, 2010.
U.S. Appl. No. 61/390,423, filed Oct. 6, 2010.
U.S. Appl. No. 61/432,980, filed Jan. 14, 2011.
U.S. Appl. No. 61/390,511, filed Oct. 6, 2010.
U.S. Appl. No. 12/965,878 Official Action dated Apr. 1, 2013.
U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.
U.S. Appl. No. 12/723,647 Official Action dated Feb. 6, 2012.
U.S. Appl. No. 12/723,647 Official Action dated Apr. 27, 2012.
U.S. Appl. No. 12/652,044 Official Action dated Feb. 7, 2012.
Alcatel-Lucent et al., "Way Forward on Enhancement for REL.10 DL MIMO", 3GPP TSG RAN # 62 Meeting, Madrid, Spain, Aug. 23-27, 2010.
Alcatel-Lucent, "Further Analysis of Companion Feedback Performance and Feedback Signaling Overhead Reduction", 3GPP TSG RAN # 62 Meeting, Madrid, Spain, Aug. 23-27, 2010.
Alcatel-Lucent et al., "Way Forward on CQI/PMI Reporting Enhancement on PUSCH 3-1 for 2,4 and 8TX", 3GPP TSG RAN # 62BIS, Xian, China, Oct. 11-15, 2010.
Marvell, "CQI Enhancement for 4Tx", 3GPP TSG RAN # 62BIS, Xian,China, Oct. 11-15, 2010.
NEC Group, "Enhancing MU-MIMO CQI", 3GPP TSG RAN # 62BIS, Xian, China, Oct. 11-15, 2010.
LG Electronics, "Further Discussion on CQI/PMI Enhancement", 3GPP TSG RAN # 62BIS, Xian, China, Oct. 11-15, 2010.
Samsung, "Coordinated Multi-Point Operation for LTE", Istanbul, Turkey, Dec. 7-10, 2010.
Alcatel-Lucent et al., "Way Forward on CSI Feedback for Rel.10 DL MIMO", 3GPP TSG RAN # 62 Meeting, Madrid, Spain, Aug. 23-27, 2010.
Marvell, "Two-Component PMI Codebook for 8TX", 3GPP TSG RAN # 62 Meeting, Madrid, Spain, Aug. 23-27, 2010.
Marvell, "Details of PUCCH 1-1 for 8Tx", 3GPP TSG RAN # 63, Jacksonville, USA, Nov. 15-19, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
ZTE, "Initial CoMP Evaluation for Homogeneous Network with High Tx Power RRHs", 3GPP TSG RAN # 64, Taipei, Taiwan, Feb. 21-25, 2011.
U.S. Appl. No. 13/346,737, filed Jan. 10, 2012.
U.S. Appl. No. 13/433,293, filed Mar. 29, 2012.
U.S. Appl. No. 12/477,152 Official Action dated Jun. 26, 2012.
U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
International Application PCT/IB2012/051511 Search Report dated Aug. 31, 2012.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.
Motorola, "Uplink Power Control for E-UTRA", 3GPP TSG RAN1 #48, St. Louis, USA, Feb. 12-16, 2007.
Nortel, "On the discussions of carrier aggregations", 3GPP TSG-RAN Working Group 1 Meeting #55, Prague, Czech Republic, Nov. 10-14, 2008.
NTT Docomo, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
Lucent Technologies, "Link Error Prediction for E-DCH", TSG-RAN WG1#35, Lisbon, Portugal, Nov. 17-21, 2003.
Ericsson, "On Channel Reciprocity for Enhanced DL Multi-Antenna Transmission", TSG-RAN WG1 #59, Jeju, Korea, Nov. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov. 9-13, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.

(56) References Cited

OTHER PUBLICATIONS

Samsung, "Discussion on Enhanced DL Beamforming", 3GPP TSG RAN WG1 Meeting #56bis, Seoul, Korea, Mar. 23-27, 2009.
Alcatel-Lucent Shanghai Bell, "Correlation-based Explicit Feedback", 3GPP TSG RAN WG1 Meeting # 59bis, Valencia, Spain, Jan. 18-22, 2010.
International Application PCT/IB2010/051088 Search Report dated Sep. 21, 2010.
International Application PCT/IB2010/053272 Search report dated Dec. 27, 2010.
Motorola, "Codebook for 8Tx DL SU-MIMO for LTE-1", TSG-RAN WG1 #59, Jeju, Korea, Nov. 9-13, 2009.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
U.S. Appl. No. 13/023,555, filed Feb. 9, 2011.
U.S. Appl. No. 13/052,075, filed Mar. 20, 2011.
U.S. Appl. No. 61/321,386, filed Apr. 6, 2010.
U.S. Appl. No. 12/838,509, filed Jul. 19, 2010.
U.S. Appl. No. 61/294,737, filed Mar. 13, 2010.
U.S. Appl. No. 12/965,878, filed Dec. 12, 2010.
U.S. Appl. No. 12/902,168, filed Oct. 12, 2010.
U.S. Appl. No. 12/903,237, filed Oct. 13, 2010.
Alcatel-Lucent, "Fractional Power Control Using Pilot Power Ration Measurements for the E-UTRA Uplink", 3GPP TSG RAN WG1 # 48, St. Louis, USA, Feb. 12-16, 2007.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.
Ericsson et al., "Way Forward for Rel-10 Feedback Framework", 3GPP TSG RAN WG1 Meeting #60, San Francisco, USA, Feb. 22, 2010.
Huawei, "Adaptive Feedback: A New Perspective of the Adaptive Codebook", 3GPP TSG RAN WG1 meeting #58, Shenzhen, China, Aug. 24-28, 2009.
Marvell, "Codebook Adaptation for ULA Antenna", 3GPP TSG RAN WG1 Meeting #60, San Francisco, USA, Feb. 22, 2010.
Marvell, "Successive Codebook Refinement: Further details and evaluation", 3GPP TSG-RAN WG1 #60bis, Beijing, Apr. 12-16, 2010.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009 (R1-092395).
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (NTT Docomo), "Text Proposal for RAN1 TR on LTE Advanced", 3GPP TSG RAN WG1 Meeting #53bis, Warsaw, Poland, Jun. 30-Jul. 4, 2008.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
Huang et al., "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subs pace-Based Channel Quantization for Distributed Cooperative Antenna Systems with Temporarily Correlated Channels", EURASIP Journal on Advances in Signal Processing, vol. 2008, Nov. 23, 2007.

NTT Docomo, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
JP Patent Application # 2011-544111 Official Action dated Nov. 6, 2012.
International Application No. PCT/IB2009/052726 Search Report dated Jan. 28, 2010.
International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
Qualcomm Europe, "Link Analysis for 4x2 and 4x4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009 (R1-091773).
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16-2001, IEEE Computer Society and IEE Microwave Theory and Techniques Society, USA, Oct. 1, 2004.
NTT Docomo et al., "Prioritized Deployment Scenarios for LTE-Advanced Studies", 3GPP TSG RAN WG4 Meeting # 50, Athens, Greece, Feb. 9-13, 2009 (R4-091011).
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.

(56) References Cited

OTHER PUBLICATIONS

Qualcomm Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8x8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
3rd Generation Partnership Project; "Technical Specification Group Radio Access Network; Evolved Universal Terrestrial Radio Access (E-UTRA)"; Physical Layer Procedures (Release 8), 3GPP TS 36.213 V8.6.0 (Mar. 2009), Sophia Antipolis, France.
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed on Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009 (R1-092415).
Nokia Siemens Networks, "PUSCH Power Control for LTE-Advanced", 3GPP TSG RAN WG1 Meeting # 57bis, Los Angeles, USA, Jun. 29-Jul. 3, 2009 (R1-092574).
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008 (R1-083103).
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008 (R1-084321).
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009 (R1-090235).
Qualcomm Europe, Notion of Anchor Carrier in LTE-A, 3GPP TSG RAN WG1 Meeting #55-bis, Ljubljana, Slovenia, Jan. 12-16, 2009 (R1-080356).
Samsung, "UL Transmission Power Control in LTE-A", 3GPP TSG RAN WG1 Meeting #56bis, Seoul, Korea, Mar. 23-27, 2009 (R1-091250).
U.S. Appl. No. 12/902,168 Office Action dated Aug. 5, 2013.
International Application PCT/IB2013/052963 Search Report dated Sep. 27, 2013.
U.S. Appl. No. 13/052,075 Office Action dated Jul. 15, 2013.
U.S. Appl. No. 13/766,790 Office Action dated Jul. 22, 2013.
U.S. Appl. No. 12/903,237 Office Action dated Aug. 16, 2013.
U.S. Appl. No. 13/543,835 Office Action dated Nov. 22, 2013.
U.S. Appl. No. 12/965,878 Notice of Allowance dated Feb. 10, 2014.
U.S. Appl. No. 12/965,878 Office Action dated Oct. 24, 2013.
U.S. Appl. No. 13/052,075 Notice of Allowance dated Nov. 8, 2013.
JP Patent Application No. 2011-551560 Office Action dated Oct. 29, 2013.
JP Patent Application No. 2012-506601 Office Action dated Oct. 22, 2013.

\* cited by examiner

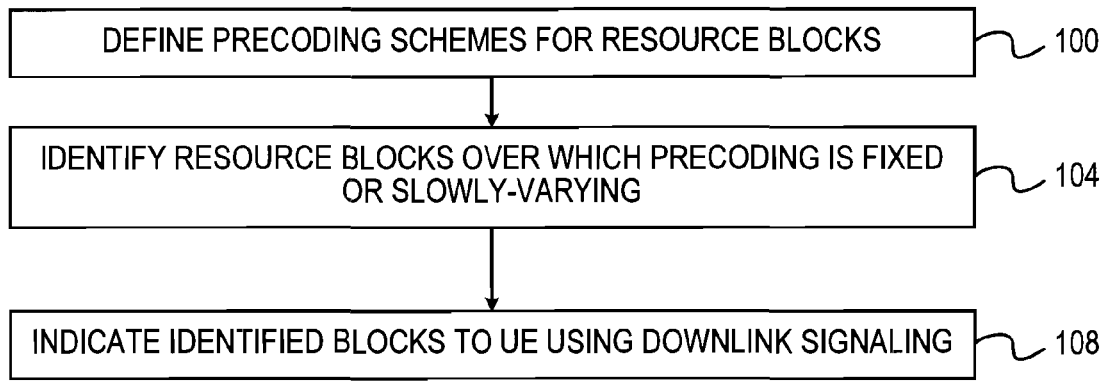
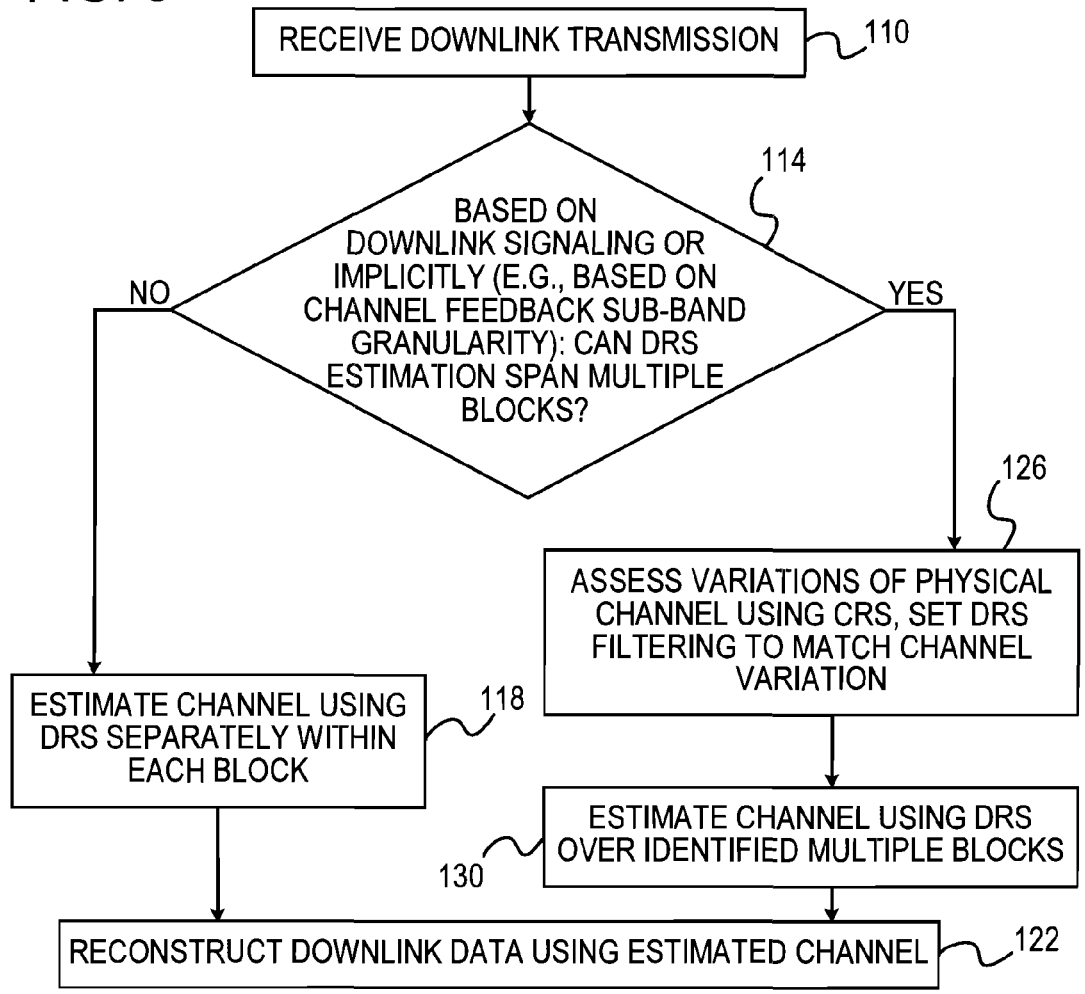

SYSTEMS AND METHODS FOR COMMUNICATION USING DEDICATED REFERENCE SIGNAL (DRS)

CROSS-REFERENCE TO RELATED APPLICATIONS

This application is a continuation-in-part of U.S. patent application Ser. No. 12/493,252, which claims the benefit of U.S. Provisional Patent Application 61/156,144, filed Feb. 27, 2009. This application also claims the benefit of U.S. Provisional Patent Application 61/293,115, filed Jan. 7, 2010. All of the above related applications are incorporated herein by reference.

FIELD OF THE DISCLOSURE

The present disclosure relates generally to communication systems, and particularly to processing reference signals in Multiple-Input Multiple-Output (MIMO) communication systems.

BACKGROUND

Some communication systems transmit data from a transmitter to a receiver over multiple communication channels, using multiple transmit antennas and multiple receive antennas. Multiple-channel transmission is used, for example, in spatial multiplexing schemes that achieve high throughput, in beam-forming schemes that achieve high antenna directivity, and in spatial diversity schemes that achieve high resilience against channel fading and multipath effects. These schemes are often referred to collectively as Multiple-Input Multiple-Output (MIMO) schemes.

MIMO schemes are contemplated, for example, for use in Evolved Universal Terrestrial Radio Access (E-UTRA) systems, also referred to as Long Term Evolution (LTE) systems. The Third Generation Partnership Project (3GPP) E-UTRA standards specify MIMO schemes for use by E-UTRA User Equipment (UE) and base stations (eNodeB). These schemes are described, for example, in 3GPP Technical Specification 36.211, entitled "Technical Specification Group Radio Access Network; Evolved Universal Terrestrial Radio Access (E-UTRA); Physical Channels and Modulation (Release 8)," (3GPP TS 36.211), version 8.6.0, March, 2009, in 3GPP Technical Specification 36.213, entitled "Technical Specification Group Radio Access Network; Evolved Universal Terrestrial Radio Access (E-UTRA); Physical Layer Procedures (Release 8)," (3GPP TS 36.213), version 8.6.0, March, 2009, and in 3GPP Technical Report 36.814, entitled "Technical Specification Group Radio Access Network; Further Advancements for E-UTRA Physical Layer Aspects (Release 9)," (3GPP TR 36.814), version 0.4.1, February, 2009, which are incorporated herein by reference.

In particular, section 6.10 of the TS 36.211 specification specifies reference signals that are used in LTE downlink transmission. Subsection 6.10.1 specifies cell-specific reference signals (also referred to as Common Reference Signals—CRS). Subsection 6.10.3 specifies UE-specific reference signals (also referred to as Dedicated Reference Signals—DRS).

SUMMARY

An embodiment that is described herein provides a method for communication. The method includes receiving in a receiver signals, which include one or more dedicated reference signals, that are transmitted from a transmitter over a communication channel in multiple blocks. The signals in each block, including the dedicated reference signals, are transmitted on a respective group of subcarriers over a respective time interval and are precoded using a respective precoding scheme that maps the signals onto multiple antenna ports of the transmitter. Based on the received signals, feedback is computed in the receiver with respect to the communication channel in each of multiple spectral sub-bands, and the feedback for the multiple spectral sub-bands is reported to the transmitter. One or more parameters of the communication channel are estimated jointly over the dedicated reference signals included in each of the spectral sub-bands for which the feedback is reported. The signals are decoded based on the estimated parameters.

In some embodiments, estimating the parameters includes evaluating an estimation criterion in the receiver, and estimating the parameters over each of the spectral sub-bands upon meeting the estimation criterion. In an embodiment, evaluating the estimation criterion includes identifying that the signals are transmitted from the transmitter to the receiver in at least a predefined number of spatial layers. In an example embodiment, the predefined number of spatial layers equals four. In a disclosed embodiment, evaluating the estimation criterion includes identifying that the signals are transmitted to the receiver in a single-user transmission mode that excludes simultaneous transmission from the transmitter to multiple receivers.

In another embodiment, receiving the signals includes receiving the signals in a Frequency Division Duplex (FDD) mode. In yet another embodiment, receiving the signals includes receiving common reference signals that are precoded with a common precoding scheme that is not receiver-specific, and estimating the parameters includes assessing at least a first parameter of the communication channel based on the common reference signals, and subsequently assessing at least a second parameter of the communication channel based on the first parameter and on the dedicated reference signals included in each of the spectral sub-bands for which the feedback is reported.

There is additionally provided, in accordance with an embodiment that is described herein, communication apparatus including one or more receive antennas and a receiver. The receiver is configured to receive via the receive antennas signals including one or more dedicated reference signals, that are transmitted from a transmitter over a communication channel in multiple blocks, wherein the signals in each block, including the dedicated reference signals, are transmitted on a respective group of subcarriers over a respective time interval and are precoded using a respective precoding scheme that maps the signals onto multiple antenna ports of the transmitter, to compute, based on the received signals, feedback with respect to the communication channel in each of multiple spectral sub-bands, to report the feedback for the multiple spectral sub-bands to the transmitter, to estimate one or more parameters of the communication channel jointly over the dedicated reference signals included in each of the spectral sub-bands for which the feedback is reported, and to decode the signals based on the estimated parameters. In some embodiments, a mobile communication terminal includes the disclosed apparatus.

The present disclosure will be more fully understood from the following detailed description of the embodiments thereof, taken together with the drawings in which:

BRIEF DESCRIPTION OF THE DRAWINGS

FIG. 4 is a flow chart that schematically illustrates a method for MIMO transmission, in accordance with an embodiment that is described herein; and FIG. 5 is a flow chart that schematically illustrates a method for MIMO reception, in accordance with an embodiment that is described herein.

DETAILED DESCRIPTION OF EMBODIMENTS

Figure 1:
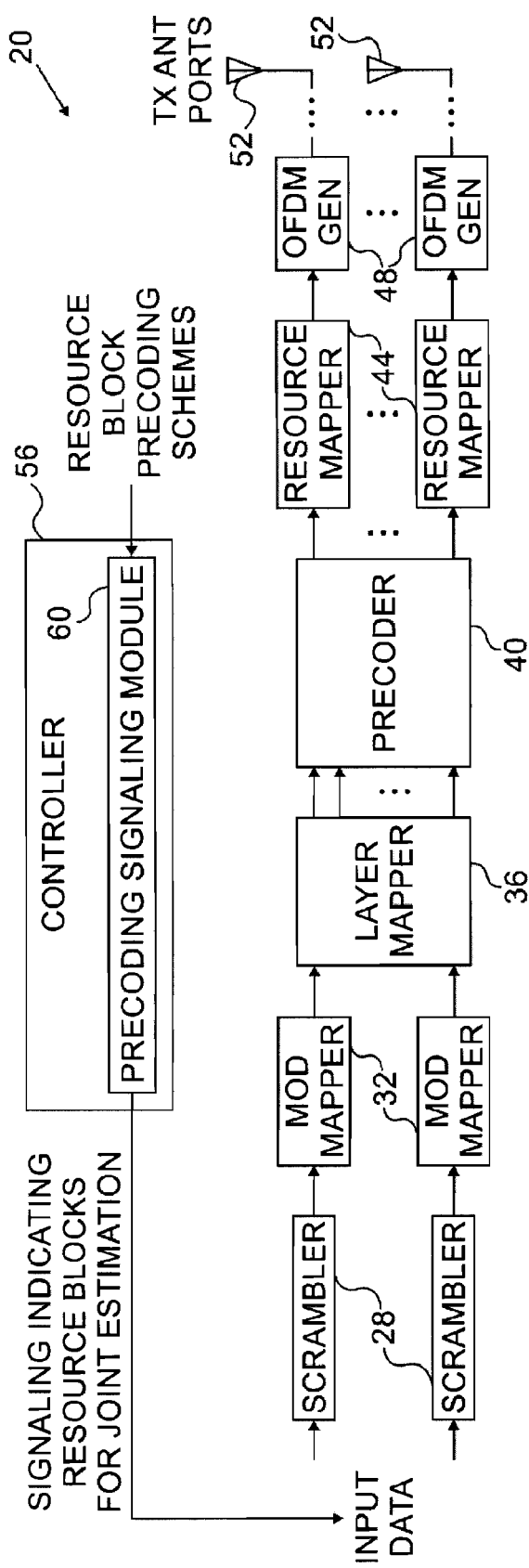
FIG. 1 is a block diagram that schematically illustrates a Multiple-Input Multiple-Output (MIMO) transmitter, in accordance with an embodiment that is described herein.

In some known MIMO schemes, a transmitter maps streams of modulated symbols onto spatial layers, i.e., onto signals that are to be transmitted to a receiver over different MIMO transmission channels. The transmitter then applies a precoding operation to map each spatial layer onto a respective set of transmit antenna ports. The transmitter allocates a set of time-frequency blocks, referred to as Resource Blocks (RB) in E-UTRA terminology, for transmission to a certain receiver. The transmission within each block is precoded using a respective precoding scheme, which specifies a mapping of spatial layers onto transmit antenna ports. Each block comprises one or more Dedicated Reference Signals (DRSs), which are precoded using the precoding scheme associated with the block, and may comprise one or more Common Reference Signals (CRSs), whose precoding is neither block-specific nor receiver-specific. A transmission process of this sort, as performed in the downlink of an E-UTRA eNodeB, is described in detail in chapter 6 of the 3GPP TS 36.211 specification, cited above.

Upon receiving such a transmission, the receiver typically estimates the channel parameters by processing the CRSs and/or DRSs, and reconstructs the data using the estimated channel parameters. Since each block (including the DRSs it contains) is precoded with a respective precoding scheme that may change from one block to another, the channel parameters often vary from block to block in a way that is unknown to the receiver a-priori. Therefore, conventional MIMO receivers usually have no choice but to process the DRSs independently for each block when estimating the channel parameters. Confining DRS-based channel estimation in conventional receivers to a single block limits the achievable estimation accuracy, because of the limited number of DRSs in each block. Since the demodulation process is typically based on the estimated channel, the receiver's demodulation performance is typically limited, as well.

Embodiments that are described hereinbelow provide improved methods and systems for receiving and reconstructing precoded MIMO transmissions. In these methods and systems, a receiver identifies a set of two or more blocks over which the precoding scheme is constant or slowly-varying. If the receiver is able to identify such a set, it estimates one or more channel parameters by jointly processing the DRSs contained in the set of blocks. Since the channel parameters are estimated over the DRSs in multiple blocks rather than individually for each block, estimation accuracy is improved and the receiver's performance in reconstructing the data is improved accordingly.

In some embodiments, the receiver computes feedback that is indicative of the communication channel in multiple spectral bands, and reports the feedback for the multiple spectral bands to the transmitter. In an embodiment, the receiver estimates the channel parameters jointly over the DRSs in each of the spectral bands for which the feedback is reported. The underlying assumption is that the precoding scheme is expected to remain constant within each of the reported spectral bands, since the transmitter has no finer-granularity information that can be used for modifying the precoding scheme.

FIG. 1 is a block diagram that schematically illustrates a MIMO transmitter 20, in accordance with an embodiment. The description that follows refers to a transmitter of an E-UTRA base station (eNodeB), although the methods and systems described herein can be used in transmitters operating in accordance with any other suitable communication standard or protocol, such as LTE-Advanced (LTE-A), IEEE 802.16 (also referred to as WiMAX), for example. Although the description that follows refers mainly to downlink transmission from the eNodeB to the UE, the disclosed methods and systems may be applicable to uplink transmission, as well.

Transmitter 20 comprises one or more modulation chains, each comprising a scrambler 28 and a modulation mapper 32. Input data for transmission is encoded with an Error Correction Code (ECC) to produce code words. Each code word is scrambled by a respective scrambler 28, and then modulated by a respective modulation mapper 32. Each modulation mapper produces a stream of complex-valued modulated symbols. Any suitable modulation scheme, such as Quadrature Phase Shift Keying (QPSK) or Quadrature Amplitude Modulation (QAM), can be used.

A layer mapper 36 maps the modulated symbol streams produced by modulation mappers 32 onto one or more spatial layers. (For a given set of time and frequency resources allocated to a certain communication channel, the multiple transmit and receive antennas add a "spatial" dimension to these resources. One of the possibilities to exploit the additional spatial dimension is by increasing the number of independent modulated symbols transmitted per time-frequency resource. The factor of increase, relative to the case of a single transmit antenna and a single receive antenna, is defined as the number of spatial layers.) Each spatial layer comprises a stream of complex values, which are to be subsequently transmitted over the MIMO communication channel.

The mapped spatial layers are provided to a precoder 40. Precoder 40 maps the spatial layers onto transmit antenna ports 52 of the transmitter according to a certain precoding scheme. (Note that a given antenna port may not necessarily correspond to a single physical antenna, but may correspond to a "virtual antenna" whose transmitted signal is generated—in a manner that the receiver need not necessarily be aware of—as a superposition (a weighted sum) of the signals stemming from a number of physical antennas. The number of transmit antenna ports may be larger than the number of layers.) Resource mappers 44 allocate resource elements (time-frequency allocations) to the respective transmit antenna ports. The outputs of mappers 44 are processed by respective Orthogonal Frequency Division Multiplexing (OFDM) generators 48, which produce OFDM signals that are transmitted via transmit antenna ports 52 toward the receiver.

In the present example, transmitter 20 comprises an E-UTRA eNodeB that transmits downlink data to multiple receivers. In some embodiments, transmitter allocates a set of time-frequency Resource Blocks (RBs) for transmission to a particular receiver. Each RB is transmitted on a certain group of OFDM subcarriers, and over a time interval comprising a certain number of OFDM symbols. Within a given RB, precoder 40 of transmitter 20 precodes the spatial layers onto transmit antenna ports 52 using a respective precoding scheme, which may generally change from one RB to another.

Figure 3:
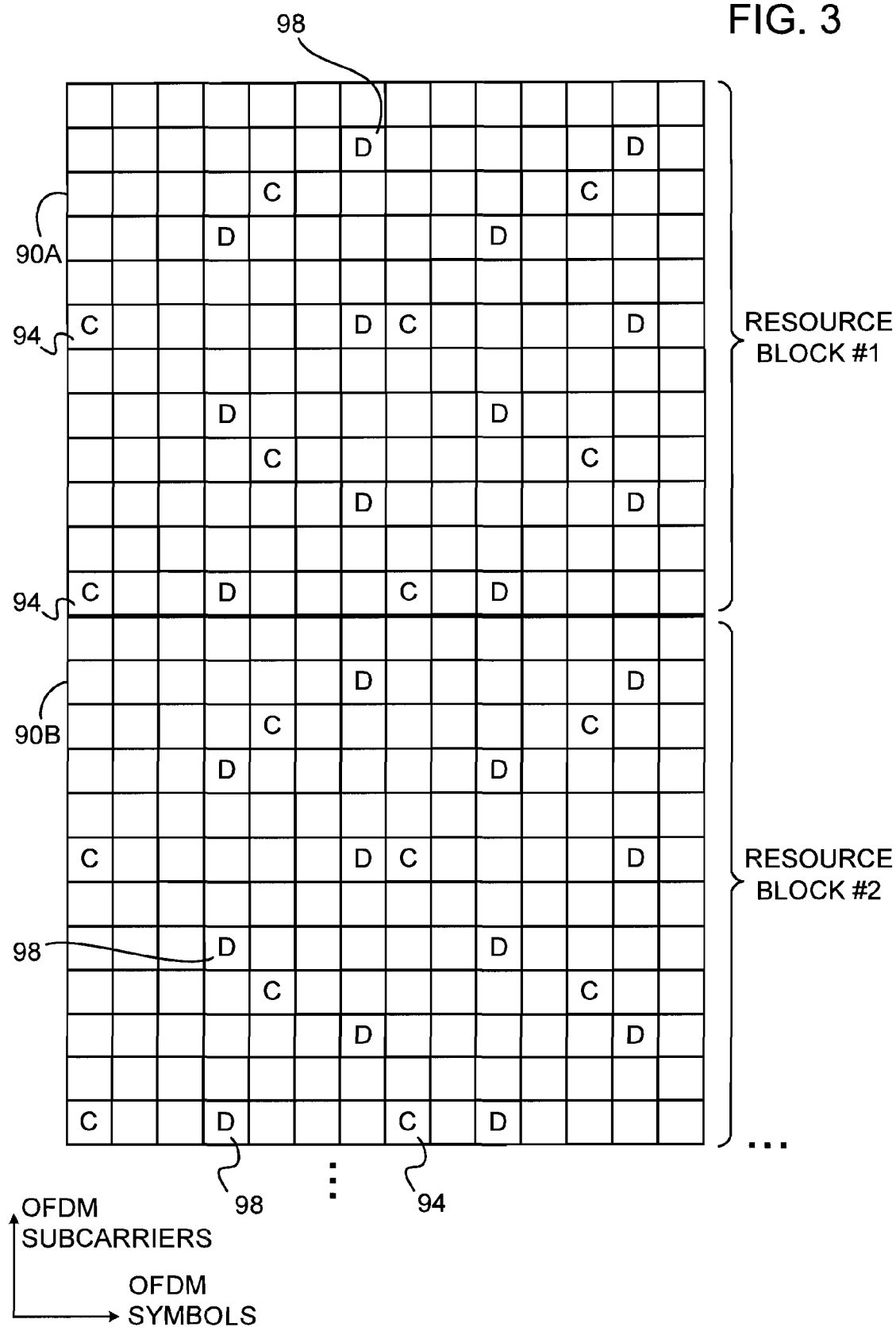
FIG. 3 is a diagram showing an allocation of time-frequency resources in a downlink MIMO transmission, in accordance with an embodiment that is described herein.

Each RB comprises Reference Signals (RSs), i.e., known pilot signals that are inserted into the RB and are used by the receiver for channel estimation and/or other functions. In some embodiments, each RB comprises Dedicated Reference Signals (DRSs), which are precoded using the same precoding scheme as the data. The DRSs may be used by the receiver to estimate the channel parameters pertaining to the RB, parameters that are later used in demodulating the block's data. Each RB may also comprise Common Reference Signals (CRSs), whose precoding is not block- or receiver-specific. An example RB configuration containing both DRSs and CRSs is shown in FIG. 3 below.

Transmitter 20 comprises a controller 56, which configures and controls the different transmitter elements. In particular, controller 56 comprises a precoding signaling module 60, which generates signaling information indicating RBs that are suitable for joint DRS processing. This signaling information is sent over the downlink to the receiver. The functions of module 60 are explained in detail further below.

Figure 2:
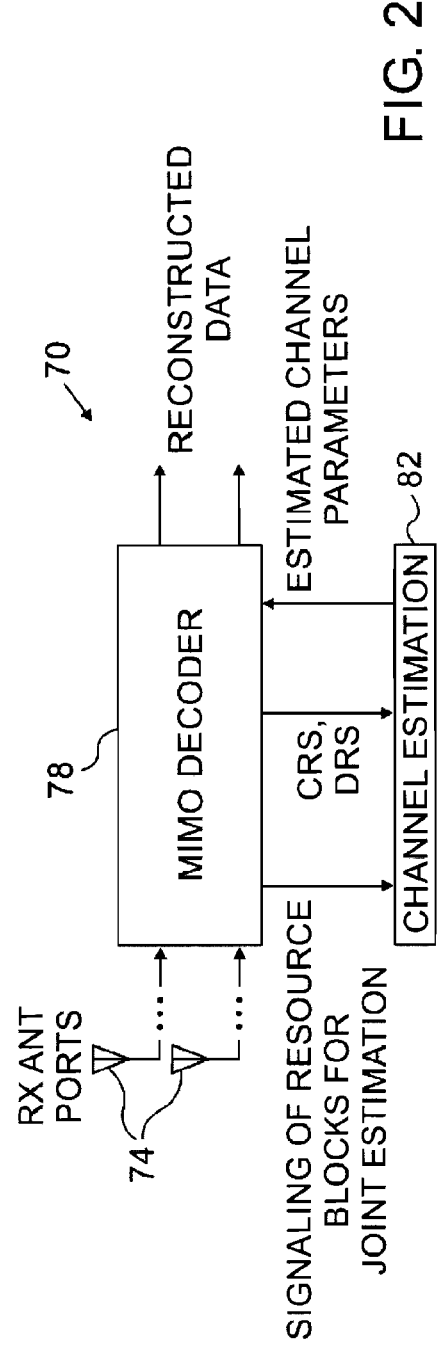
FIG. 2 is a block diagram that schematically illustrates a MIMO receiver, in accordance with an embodiment that is described herein.

FIG. 2 is a block diagram that schematically illustrates a MIMO receiver 70, in accordance with an embodiment. Receiver 70 comprises one or more receive antenna ports 74, a MIMO decoder 78 and a channel estimation module 82. Although the description that follows refers to a receiver of an E-UTRA UE, other receivers are contemplated. As noted above, the methods and systems described herein are applicable to various other communication protocols.

Receiver 70 receives a downlink signal from transmitter 20 using antenna ports 74. MIMO decoder 78 decodes the received MIMO signal, so as to demodulate the data sent over the different spatial layers. The reconstructed data is provided as output of receiver 70. For each RB, channel estimation module 82 estimates the effective communication channel over which this RB was transmitted. Decoder 78 coherently demodulates the received MIMO signal based on the estimated channel, so as to reconstruct the data conveyed by the spatial layers in this RB.

The transmitter and receiver configurations shown in FIGS. 1 and 2 are simplified example configurations, which are depicted for the sake of conceptual clarity. In alternative embodiments, any other suitable transmitter or receiver configuration can also be used. Elements that are not mandatory for explanation of the disclosed techniques, such as various Radio Frequency (RF) elements, have been omitted from FIGS. 1 and 2 for the sake of clarity.

The different components of transmitter 20 and receiver 70 may be implemented using dedicated hardware, such as using one or more Application-Specific Integrated Circuits (ASICs) and/or Field-Programmable Gate Arrays (FPGAs). Alternatively, some transmitter or receiver components may be implemented using software running on general-purpose hardware, or using a combination of hardware and software elements. In some embodiments, controller 56, channel estimation module 82 and/or some parts of MIMO decoder 78 may be implemented using general-purpose processors, which are programmed in software to carry out the functions described herein. The software may be downloaded to the processors in electronic form, over a network, for example, or it may, alternatively or additionally, be provided and/or stored on tangible media, such as magnetic, optical, or electronic memory.

In some embodiments, module 82 in receiver 70 estimates the channel parameters using a two-stage estimation process. In the first stage, module 82 estimates long-term channel properties such as Doppler spread and multipath delay spread (the latter is translated to "coherence bandwidth"). In the second stage, module 82 estimates the short-term, instantaneous channel parameters by filtering the DRSs. Module 82 sets the appropriate filtering in the second stage based on the long-term properties estimated in the first stage. Two-stage channel estimation processes of this sort are described, for example, by Hanzo et al., in "OFDM and MC-CDMA for Broadband Multi-User Communications, WLANs and Broadcasting," Wiley-IEEE Press, Sep. 19, 2003, chapter 14, pages 485-548, which is incorporated herein by reference.

Typically, a channel having low Doppler spread is typically slowly-varying in time and can therefore be estimated over relatively long time intervals, and vice versa. A channel having low multipath delay spread (i.e., large coherence bandwidth) is typically slowly-varying in frequency and therefore can be estimated over a relatively large number of subcarriers, and vice versa. Appropriate setting of the filtering in time and frequency is important for maintaining high demodulation performance.

It is noted that the channel parameters in a given RB depend on the precoding scheme applied by the transmitter, since the precoding scheme defines the specific combination of transmit antenna ports used for transmission. Therefore, module 82 estimates the channel parameters in a given RB by processing the DRSs, which are precoded using the specific precoding scheme of the RB. Module 82 may also consider the CRSs during this process, in order to assess variations in the physical channel between the transmitter and the receiver.

FIG. 3 is a diagram showing an allocation of time-frequency resources in a downlink MIMO transmission, in accordance with an embodiment. In a typical E-UTRA implementation, the base station transmits a sequence of OFDM symbols, each symbol transmitted over multiple OFDM subcarriers. This time-frequency resource is partitioned into Resource Blocks (RBs). In the example of FIG. 3, resource blocks including twelve subcarriers each configured to carry fourteen OFDM symbols is shown. The base station allocates a set of RBs for downlink transmission to each UE. The RBs assigned to a given UE are not necessarily contiguous in time or frequency.

The example of FIG. 3 shows two RBs 90A and 90B, which are adjacent in frequency. The horizontal axis is a time axis, in units of OFDM symbols. The vertical axis is a frequency axis, in units of OFDM subcarriers. Each RB comprises Reference Signals (RSs) inserted at known locations. In the example of FIG. 3, each RB comprises multiple Common Reference Signals (CRSs) 94 and multiple Dedicated Reference Signals (DRSs) 98.

The RB configuration of FIG. 3 is chosen by way of example, and the disclosed methods and systems are in no way limited to any specific configuration. Any other suitable RB configuration can be used. Several possible RB configurations are addressed in chapter 6 of the 3GPP TS 36.211 specification, cited above.

As explained above, receiver 70 estimates the channel parameters by processing the RSs transmitted in the RBs. The description that follows focuses on DRS-based estimation. It is noted that estimation accuracy can depend on the number of DRSs over which the channel parameters are estimated. Estimating the channel over an insufficient number of DRSs may lead to inaccurate channel parameters. When using two-stage channel estimation, as described above, inaccurate estimation of the Doppler or multipath spread in the first stage may lead to inaccurate filtering in the second stage. Thus, it may be desirable to estimate the channel over as many DRSs as possible, and in particular over the DRSs in multiple RBs.

On the other hand, channel estimation should not be performed on multiple RBs indiscriminately, since different RBs may have different channel parameters. In particular, different RBs (including the DRSs they contain) may generally be precoded with different precoding schemes, i.e., be transmitted via different antenna port combination.

In practice, the rate at which the base station modifies the precoding scheme from one RB to another (within the RBs allocated to a given UE) can vary considerably in different MIMO scenarios. For example, when a Frequency Division Duplex (FDD) base station uses MIMO beam-forming without feedback from the UE, the base station typically has only rough information as to the actual downlink channel parameters. In this scenario, the base station may maintain a fixed precoding scheme over the entire frequency range for relatively long time periods (e.g., several seconds). In another scenario, the base station may modify the precoding scheme at a rate that is comparable with the variations in the physical propagation channel. This scenario may occur, for example, when a Time Division Duplex (TDD) base station adapts the precoding scheme to follow physical channel variations based on feedback from the UE.

In yet another scenario, the base station may modify the precoding scheme abruptly from one RB to the next, even though both RBs are allocated to the same UE and may be adjacent in time and/or frequency. This scenario may occur, for example, when the base station determines the precoding not only based on the communication channel to the UE in question, but also based on other considerations. For example, the base station may set the precoding scheme in a way that minimizes interference to other UEs. Since these other UEs may not be allocated an identical set of RBs, the precoding scheme may change considerably from one RB to another.

In some embodiments, receiver 70 identifies two or more RBs, which are suitable for joint DRS-based channel estimation. Generally, in order to benefit from estimation over DRSs in multiple RBs, the RBs should meet two criteria:

The physical propagation channel between the transmitter and the receiver (e.g., link geometry and multipath conditions) is sufficiently similar over the RBs.

The precoding schemes used in the RBs are identical or sufficiently similar.

Typically, the receiver identifies RBs whose precoding schemes differ by no more than a predefined distance as candidates for joint DRS-based channel estimation. In some embodiments, the permitted variation among the precoding schemes is derived from the variation of the physical propagation channel. In other words, RBs whose precoding varies by no more than the variation of the propagation channel may be used for joint DRS-based channel estimation. Alternatively, the permitted variation can be determined using any other suitable criterion. In a typical implementation, the receiver estimates the channel by applying certain filtering to the DRSs. The filtering scheme is selected based on the amount of variation in the physical communication channel over the identified blocks. A mechanism of this sort is described in detail in FIG. 5 below.

In some embodiments, the transmitter (base station) sends signaling information to the receiver (UE), indicating which RBs may be used for joint channel estimation. In some embodiments, the signaling information defines a certain granularity of RBs, in time and/or frequency, over which joint estimation is permitted.

The signaling information may be sent to a given UE at any suitable rate and using any suitable signaling mechanism. For example, the signaling information can be sent in using semi-static mechanisms that are common to multiple UEs, such as using "system information" messages defined in E-UTRA. Additionally or alternatively, the signaling information can be sent using semi-static UE-specific mechanisms, such as in messages that instruct the UE to receive precoded transmissions. In E-UTRA, such messages are called Radio Resource Control (RRC) messages. Further additionally or alternatively, the signaling information can be sent using dynamic UE-specific signaling mechanisms, which specify the resource allocation to the UE in a particular Transmission Time Interval (TTI). In E-UTRA, this signaling is sent over the Physical Downlink Control Channel (PDCCH). Further additionally or alternatively, the signaling information can be sent using any other suitable signaling means.

In some embodiments, the signaling information comprises a single bit. One bit value indicates to the UE that no joint channel estimation is permitted, i.e., that DRS-based channel estimation is to be performed on a RB-by-RB basis. The other bit value indicates that joint DRS-based estimation is permitted over the entire set of RBs allocated to the UE (e.g., because the precoding scheme is fixed or varies at a rate that is not faster than the propagation channel over the entire downlink allocation of the UE).

In an alternative embodiment, the signaling information may define the frequency granularity and time granularity, each using three values. For example, the frequency granularity can be defined as one of (1) a single RB, (2) the RBs in a single sub-band (out of a group of predefined sub-bands, and (3) all RBs allocated to the UE within the given TTI. In E-UTRA, each sub-band comprises a group of RBs whose mapping is defined in a Channel Quality Information (CQI) report. Similarly, the time granularity can be defined as one of (1) a single TTI, (2) the time duration over which frequency allocation does not vary, and (3) precoding fixed or smoothly-varying over time.

The time and frequency granularity can be signaled to the UE using a pair of values $[i_T, i_F]$, wherein $i_T \in \{1,2,3\}$ denotes the time granularity and $i_F \in \{1,2,3\}$ denotes the frequency granularity. In some embodiments, unlikely combinations (e.g., [1,3] or [3,1]) can be omitted, so that the remaining value combinations can be signaled using only three bits. In an embodiment, a single sub-band can be set to be the basic frequency resource scheduling unit used by the base station.

As yet another example that is particularly suitable for fast TTI-by-TTI signaling, the signaling information comprises a single bit indicating whether the granularity is a single RB or all allocated RBs, wherein the time granularity is assumed to be a single TTI.

In some embodiments, semi-static signaling and dynamic signaling can be combined. For example, a certain pair of $[i_T, i_F]$ values can be signaled to the UE semi-statically and used as a default. In addition, a single bit can be signaled per TTI (e.g., over the PDCCH) and used to overrule the default values. This bit may indicate, for example, that precoding has changed in this TTI and therefore previous channel estimation is irrelevant and should not be used. Frequency granularity typically does not affected by this overruling.

Further alternatively, the base station can use any other suitable signaling mechanism for indicating to the UE which RBs can be used for joint DRS-based channel estimation. Typically although not necessarily, the signaling mechanism may inform the UE of the applicable RB granularity, as well as the actual identities of the RBs over which precoding is fixed or slowly-varying.

The embodiments described herein refer mainly to precoding schemes in which the downlink transmission appears to the UE as originating from a single virtual transmit antenna (port 5 in E-UTRA). The methods and systems described herein, however, are in no way limited to such schemes. The disclosed techniques are equally applicable to precoding schemes that appear to the receiver as originating from multiple virtual transmit antennas, such as spatial multiplexing schemes.

In some embodiments, the receiver may identify RBs whose precoding is unlikely to vary considerably using an implicit criterion, which does not necessarily involve signaling from the transmitter. For example, when the base station transmits multiple spatial layers with precoded DRSs to the same UE, the base station is typically unlikely to transmit to other UEs within the same RB allocation. Therefore, the base station is unlikely to modify the precoding scheme abruptly within the RB allocation. Following this logic, the UE may assume that precoding is fixed or slowly-varying if the UE receives more than a single spatial layer from the base station. In another embodiment, the UE may assume that precoding is fixed or slowly-varying if the UE receives more than N spatial layers, $N \geq 2$.

In some embodiments, receiver 70 estimates feedback that is indicative of the communication channel between transmitter 20 and receiver 70, and reports this feedback to the transmitter. Example feedback types comprise Channel State Information (CSI), Precoding Matrix Indicator (PMI), or any other suitable feedback type. The transmitter adapts its transmissions to the receiver, e.g., the precoding scheme, based on the feedback reported by the receiver. In an example embodiment, the receiver estimates and reports the channel feedback at a certain spatial granularity, i.e., for each of multiple spectral sub-bands.

In some embodiments, receiver 70 estimates the channel parameters jointly over the DRSs in each of the spectral sub-bands for which the channel feedback is reported. The underlying assumption behind this mechanism is that the transmitter is unlikely to modify the precoding scheme within a given spectral interval, because it only has feedback information from the receiver at the granularity of the spectral intervals. In other words, when the receiver provides feedback at a certain spectral granularity, the transmitter has no information that can be used for modifying the precoding scheme at a finer granularity. Typically, this technique is used in FDD systems.

In some embodiments, the above assumption holds in some transmission modes but not in others. Therefore, in some embodiments the receiver first evaluates a certain estimation criterion that assesses whether the above assumption holds or not. If the criterion is met, the receiver assumes that the precoding scheme is fixed within each spectral sub-band and estimates the channel parameters accordingly. If the criterion is not met, the receiver does not make this assumption.

In an example embodiment, the receiver estimates the channel parameters jointly over the DRSs of each spectral sub-band if the number of spatial layers that are transmitted from the transmitter to the receiver is greater than a predefined number of spatial layers. In one embodiment the predefined number of spatial layers is four, although any other suitable number can be used.

In another example embodiment, the receiver estimates the channel parameters jointly over the DRSs of each spectral sub-band if the transmitter transmits the signals to the receiver in a single-user mode that does not permit simultaneous transmission to multiple receivers. An example mode of this sort is a Single-User MIMO (SU-MIMO) mode defined in the E-UTRA specifications, cited above. Further alternatively, any other suitable criteria can be used, such as various criteria for verifying that no Multi-User MIMO (MU-MIMO) or Cooperative Multipoint (COMP) is currently applied.

FIG. 4 is a flow chart that schematically illustrates a method for MIMO transmission, in accordance with an embodiment. The method begins at a precoding definition step 100 with transmitter 20 (in this example an E-UTRA eNodeB) defining precoding schemes for respective RBs to be transmitted to a give UE. The transmitter identifies two or more RBs over which the precoding scheme remains fixed or varies slowly, at a block identification step 104. The term "varies slowly" typically means that the precoding scheme varies at a rate that is no faster than that of the physical propagation channel between the transmitter and the receiver. The transmitter then indicates the identified blocks to the receiver using downlink signaling, at a signaling step 108.

FIG. 5 is a flow chart that schematically illustrates a method for MIMO reception, in accordance with an embodiment. In the method of FIG. 5, the receiver sets the filtering scheme to be used in DRS-based channel estimation, to match the amount of variation (over frequency and/or time) in the physical communication channel, regardless of precoding.

The method of FIG. 5 begins at a reception step 110 with receiver 70 (in this example an E-UTRA UE) receiving a downlink transmission from a transmitter (in this example an E-UTRA eNodeB). The downlink transmission is partitioned into RBs, each containing CRSs and DRSs, such as in the configuration of FIG. 3 above. The receiver attempts to identify two or more RBs whose precoding is sufficiently similar to enable joint DRS-based estimation, at a RB checking step 114. The receiver may identify suitable RBs based on signaling information sent from the transmitter or using an implicit criterion. In some embodiments, the receiver identifies the RBs belonging to the same spectral sub-band used for reporting channel feedback, as explained above.

If no suitable RBs can be identified, the receiver estimates the channel parameters over the DRSs of each RB separately, i.e., on an RB-by-RB basis, at a single block estimation step 118. MIMO decoder 78 demodulates the data conveyed in the RBs using the estimated channel parameters, at a demodulation step 122.

If, on the other hand, the receiver is able to identify two or more RBs whose precoding is sufficiently similar, the receiver assesses the amount of variation (over time and/or frequency) of the physical communication channel over the identified RBs, at a variation assessment step 126. Typically, the receiver performs this task by processing the received CRSs. Since the CRSs are not precoded in any UE- or RB-specific manner, they can be used to assess properties of the physical propagation channel, irrespective of precoding. The receiver may assess the amount of channel variation by estimating channel properties such as Doppler and multipath spread (or the equivalent coherence bandwidth). Having assessed the amount of channel variation, the receiver sets the filtering scheme for joint DRS-based channel estimation depending on the assessed variation.

Module 82 in the receiver now estimates the channel parameters by jointly processing the DRSs in the identified RBs, at a multi-block estimation step 130. Module 82 typically estimates the channel parameters by filtering the DRSs using the filtering scheme set at step 126 above. MIMO decoder 78 performs demodulation using the estimated channel parameters, at step 122.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
   in a receiver, receiving signals, which comprise one or more dedicated reference signals, that are transmitted from a transmitter over a communication channel in multiple blocks, wherein the signals in each block, including the dedicated reference signals, are transmitted on a respective group of subcarriers over a respective time interval and are precoded using a respective precoding scheme that maps the signals onto multiple antenna ports of the transmitter;
   based on the received signals, computing in the receiver feedback with respect to the communication channel in each of multiple spectral sub-bands, and reporting the feedback for the multiple spectral sub-bands to the transmitter;
   upon identifying that the signals are transmitted from the transmitter to the receiver in at least a predefined number of spatial layers, estimating one or more parameters of the communication channel jointly over the dedicated reference signals comprised in each of the spectral sub-bands for which the feedback is reported; and
   decoding the signals based on the estimated parameters.

2. The method according to claim 1, wherein estimating the parameters comprises evaluating an estimation criterion in the receiver, and estimating the parameters over each of the spectral sub-bands upon meeting the estimation criterion.

3. The method according to claim 1, wherein identifying that the signals are transmitted in at least a predefined number of spatial layers comprises identifying that the signals are transmitted from the transmitter to the receiver in at least four spatial layers.

4. The method according to claim 1, comprising estimating the parameters of the communication channel upon identifying that the signals are transmitted to the receiver in a single-user transmission mode that excludes simultaneous transmission from the transmitter to multiple receivers.

5. The method according to claim 1, wherein receiving the signals comprises receiving the signals in a frequency Division Duplex (FDD) mode.

6. The method according to claim 1, wherein receiving the signals comprises receiving common reference signals that are precoded with a common precoding scheme that is not receiver-specific, and wherein estimating the parameters comprises assessing at least a first parameter of the communication channel based on the common reference signals, and subsequently assessing at least a second parameter of the communication channel based on the first parameter and on the dedicated reference signals comprised in each of the spectral sub-bands for which the feedback is reported.

7. A communication apparatus, comprising:
   one or more receive antennas; and
   a receiver, which is configured to receive via the receive antennas, signals comprising one or more dedicated reference signals, that are transmitted from a transmitter over a communication channel in multiple blocks, wherein the signals in each block, including the dedicated reference signals, are transmitted on a respective group of subcarriers over a respective time interval and are precoded using a respective precoding scheme that maps the signals onto multiple antenna ports of the transmitter, to compute, based on the received signals, feedback with respect to the communication channel in each of multiple spectral sub-bands, to report the feedback for the multiple spectral sub-bands to the transmitter, to estimate, upon identifying that the signals are transmitted from the transmitter to the receiver in at least a predefined number of spatial layers, one or more parameters of the communication channel jointly over the dedicated reference signals comprised in each of the spectral sub-bands for which the feedback is reported, and to decode the signals based on the estimated parameters.

8. The apparatus according to claim 7, wherein the receiver is configured to evaluate an estimation criterion, and to estimate the parameters over each of the spectral sub-bands upon meeting the estimation criterion.

9. The apparatus according to claim 7, wherein the receiver is configured to estimate the parameters of the communication channel upon identifying that the signals are transmitted from the transmitter to the receiver in at least four spatial layers.

10. The apparatus according to claim 7, wherein the receiver is configured to estimate the parameters of the communication channel upon identifying that the signals are transmitted to the receiver in a single-user transmission mode that excludes simultaneous transmission from the transmitter to multiple receivers.

11. The apparatus according to claim 7, wherein the receiver is configured to receive the signals in a frequency Division Duplex (FDD) mode.

12. The apparatus according to claim 7, wherein the receiver is configured to receive common reference signals that are precoded with a common precoding scheme that is not receiver-specific, to assess at least a first parameter of the communication channel based on the common reference signals, and to subsequently assess at least a second parameter of the communication channel based on the first parameter and on the dedicated reference signals comprised in each of the spectral sub-bands for which the feedback is reported.

13. A mobile communication terminal comprising the apparatus of claim 7.

* * * * *